United States Patent [19]

Scheuerman et al.

[11] Patent Number: 4,548,732
[45] Date of Patent: Oct. 22, 1985

[54] PROCESS FOR ACIDIZING HOT SILICEOUS MATERIAL

[75] Inventors: Ronald F. Scheuerman, Bellaire; Seth A. Silverman, Richmond, both of Tex.

[73] Assignee: Shell Oil Company, Houston, Tex.

[21] Appl. No.: 601,538

[22] Filed: Apr. 18, 1984

[51] Int. Cl.$^4$ ............................................. E21B 43/27
[52] U.S. Cl. .............................. 252/8.55 C; 166/300; 166/307
[58] Field of Search ................... 252/8.55 C; 166/307, 166/300

[56] References Cited

U.S. PATENT DOCUMENTS

| | | | |
|---|---|---|---|
| 3,889,753 | 6/1975 | Richardson | 252/8.55 X |
| 4,090,563 | 5/1978 | Lybarger et al. | 166/307 |
| 4,203,492 | 5/1980 | Watanabe | 252/8.55 X |

Primary Examiner—Herbert B. Guynn

[57] ABSTRACT

The dissolving of siliceous material in an environment containing corrodable metal and having a temperature exceeding about 300° F. is improved by using an aqueous solution containing an amount of ammonium fluoride equivalent to that in a 2–3 molar solution of hydrogen fluoride and enough weak acid and weak acid salt to provide a pH of near to but less than 7.

2 Claims, 2 Drawing Figures

PROCESS FOR ACIDIZING HOT SILICEOUS MATERIAL

BACKGROUND OF THE INVENTION

This invention relates to contacting siliceous materials, in regions hotter than about 300° F., with an acidic solution of hydrogen fluoride such as those described in U.S. Pat. No. 3,889,753 by E. A. Richardson. The disclosures of that patent are incorporated herein by reference. The present invention relates to a process for formulating and utilizing such an acidic solution in a way that increases the amount of silica dissolved and decreases the amount of corrosion caused by the solution in such a hot environment.

SUMMARY OF THE INVENTION

The present invention relates to dissolving siliceous material in environments which contain corrodable metal and are hotter than about 300° F. An acidizing solution is compounded to consist essentially of an aqueous solution of about a two to three molar hydrogen fluoride equivalent of an ammonium fluoride salt and a concentration of weak acid and weak acid salt sufficient to provide a solution pH near to but less than 7. The acidizing solution is injected into the region to be treated in the absence of a metal protecting corrosion inhibitor.

DESCRIPTION OF THE INVENTION

Figure 1:
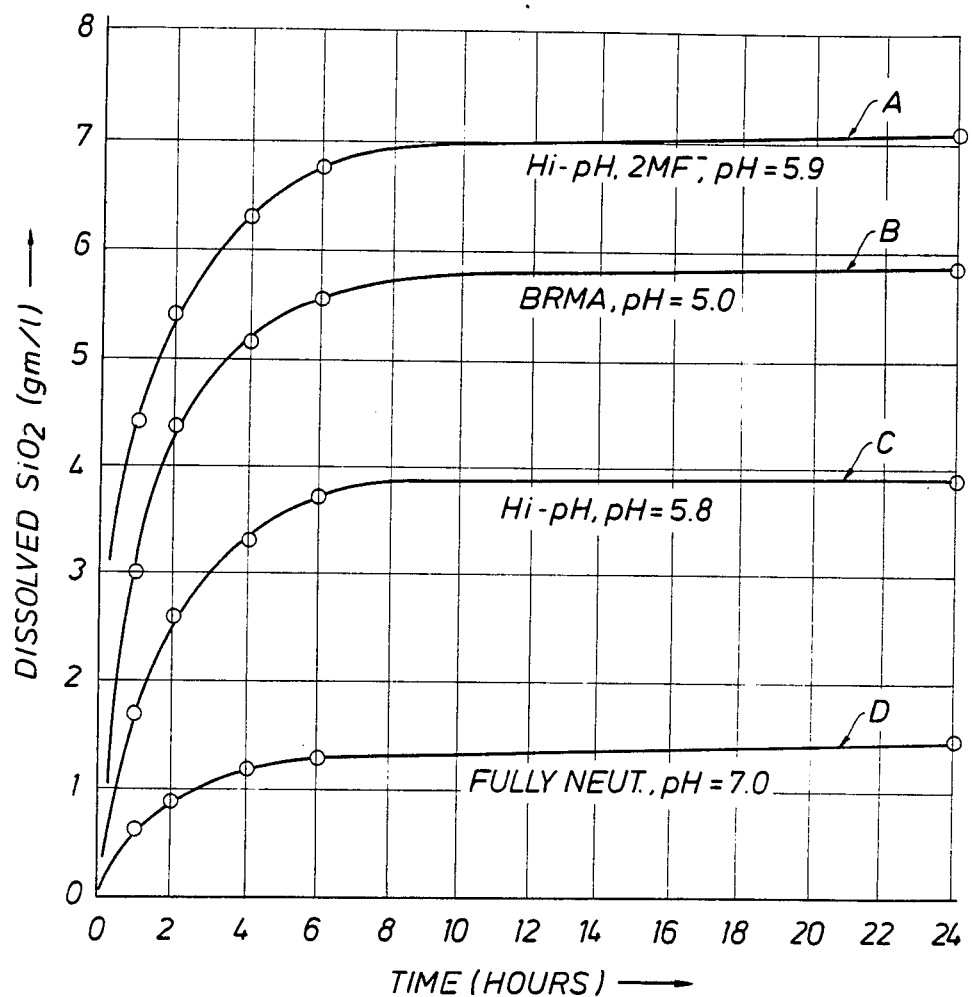
FIG. 1 shows a graph of amount of $SiO_2$ dissolved with time in slurries of clay in various siliceous material acidizing solutions.

FIG. 1 shows the amount of $SiO_2$ which was dissolved at different times in 30 cc samples of slurries of 25 grams per liter of sodium montmorillinite clay suspended in various aqueous hydrogen fluoride-containing acidizing solutions at 150° F. In FIG. 1, curve A was provided by a high pH, high-fluoride solution, in accordance with the present invention. It was an aqueous solution which was 2 molar in acetic acid, 1.5 molar in ammonium hydroxide, 2 molar in ammonium fluoride and had a pH of 5.5 to 5.9. The curve B solution was a conventional medium pH Buffer Regulated Mud Acid (BRMA) consisting of an aqueous solution which was 2 molar in acetic acid, 1 molar in ammonium hydroxide, 1 molar in ammonium fluoride and had a pH of 4.5 to 5. The curve C solution was a high pH BRMA solution (like that of curve A) but with only 1 molar ammonium fluoride. The solution of curve D was such a 1 molar ammonium fluoride solution to which enough ammonium hydroxide had been added to provide a pH of substantially 7.

The medium and high pH BRMA solutions of curves B and C were substantially the same except for the higher pH solution containing enough ammonium hydroxide to provide that pH. Although such a higher pH BRMA solution is known to be less corrosive, its silica dissolving capability is known to be significantly less than that of the medium pH BRMA solution (curve B of FIG. 1).

The high pH, high fluoride BRMA solution of the present invention (curve A, FIG. 1), in which the amount of fluoride ions were substantially doubled, exhibited a dissolving power significantly greater than that of either of the conventional medium or high pH BRMA solutions. This would be expected. The increasing of the concentration of fluoride ions increases the concentration of hydrogen fluoride in the solution and thus increases the capability of the solution to dissolve more $SiO_2$.

Figure 2:
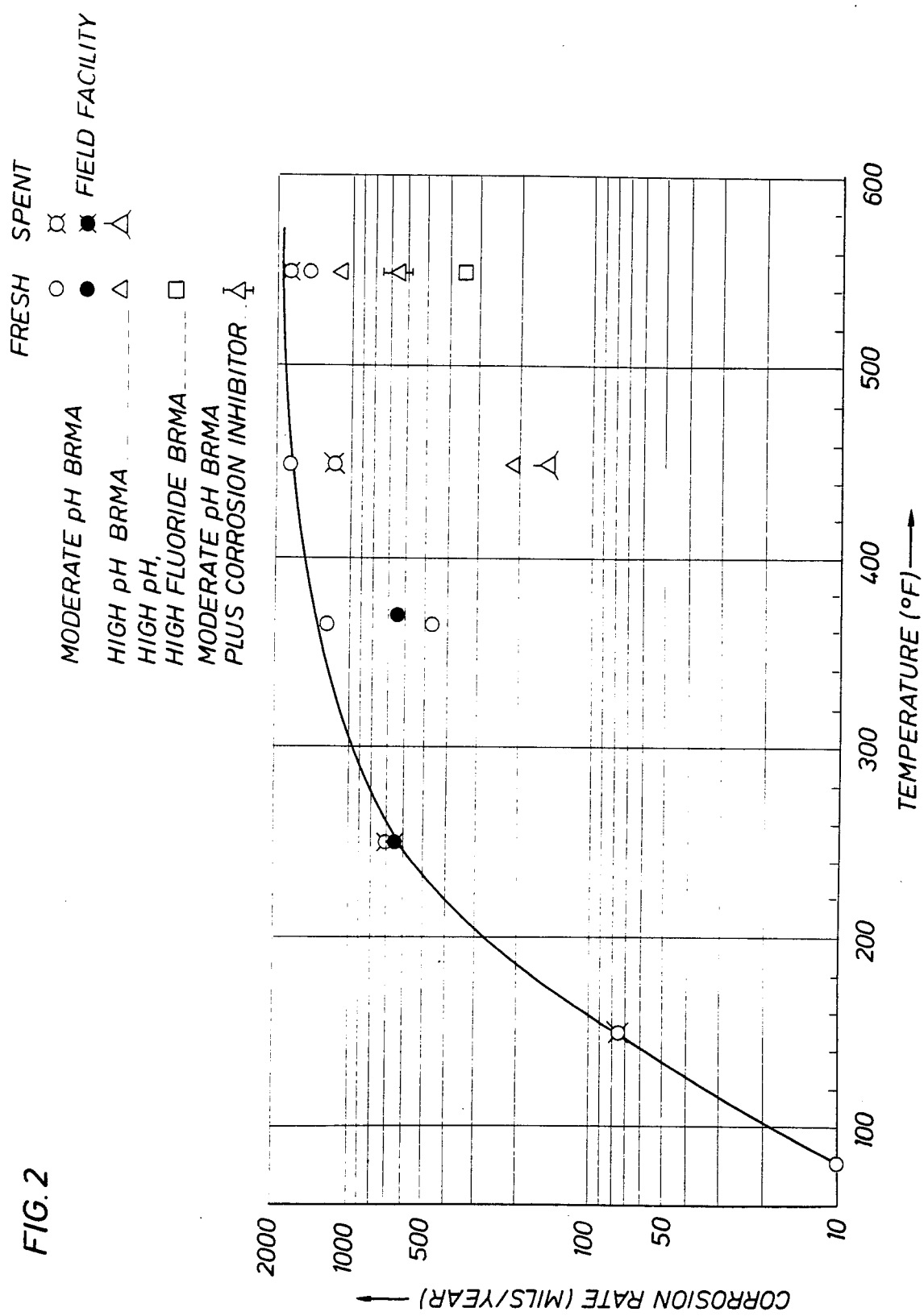
FIG. 2 shows a graph of rates of corrosion at increasing temperatures for various siliceous material acidizing solutions.

FIG. 2 shows the results of a series of corrosion rate tests, from both laboratory and field facilities, regarding (1) a moderate pH BRMA solution, (2) a high pH BRMA solution, (3) a high pH, high fluoride BRMA solution of the present invention and (4) a moderate pH BRMA solution mixed with a corrosion inhibitor. The solid line on FIG. 2 shows the corrosion rate for the moderate pH BRMA as a function of temperature. In the tests containing the corrosion inhibitor the fluid tested contained a conventional proportion of routinely used metal-coating type of corrosion inhibitor for acid systems. The inhibitor used was Dowell's A-186 metal coating corrosion inhibitor for acid systems. The tested inhibitor is commonly recognized in the industry as being generally effective for retarding metal corrosion without significantly reducing the rate of acidization by strong, hydrochloric-hydrofluoric mud acids.

FIG. 2 shows an unexpected result. The addition of the metal coating corrosion inhibitor to the moderate pH BRMA solution was significantly less effective in reducing the corrosion rate of the solution than was the doubling of the fluoride ion content of the solution (thus causing it to become a high pH, high fluoride BRMA solution of the present invention). In accordance with conventional teachings and beliefs it would be expected that such a doubling of the ionic strength of a BRMA solution would increase rather than decrease the corrosivity of the solution.

The data in Table 1 also shows that the high pH, high fluoride solution is more effective in dissolving clay than is the moderate pH BRMA containing corrosion inhibitor. Apparently the corrosion inhibitor adsorbs out on the rock thereby reducing effective contact with the BRMA solution.

TABLE 1

| Test | Core | Temperature °F. | System | Effective Concentration Millimoles $SiO_2$ and Aluminum |
|---|---|---|---|---|
| 1 | South Texas | 400 | BRMA | 90 |
| 2 | | | BRMA + 2% corrosion inhibitor | 21 |
| 3 | | | High pH BRMA | 45 |
| 4 | | | High pH, 2MF⁻ BRMA | 150 |
| 5 | Gulf Coast | 350 | BRMA | 94 |
| 6 | | | High pH BRMA | 32 |
| 7 | | | High pH, 2MF⁻ BRMA | 132 |
| 8 | South Texas | 240 | BRMA | 70 |
| 9 | | | High pH, 2MF⁻ BRMA | 76 |
| 10 | | | 7½% HCl—1½% HF | 120 |
| 11 | California | 130 | BRMA | 100 |
| 12 | | | High pH, 2MF⁻ BRMA | 120 |
| 13 | | | 7½% HCl—1½% HF | 170 |

Table 1 lists the results of flowing 20 pore volumes of the same solutions through cores of reservoir formations of the type listed at the temperatures listed. In each case the flow rates were 10 cc/hr and the corrosion inhibitor, where used, contained 2% volume of the A-186 inhibitor.

The aqueous liquid used in the present high pH, high fluoride BRMA solutions can be pure water or substantially any relatively dilute aqueous liquid that is compatible with fluoride salts, weak acids, weak acid salts, and the acidification reaction products of hydrogen fluoride and siliceous materials. Such aqueous liquids can advantageously contain additives such as wetting agents, detergents, oil solvents, oil and water mutual solvents, water thickening agents, suspended particles (such as fracture propping particles, or sand or gravel pack-forming particles) and can contain additives such as those conventionally utilized in forming and/or acidizing fractures or sand packs, or gravel packs, or the like. Particularly suitable aqueous liquids comprise water or relatively dilute, soft, saline solutions.

Fluoride salts suitable for use in the present invention comprise ammonium fluoride and ammonium bifluoride. Where ammonium bifluoride is used, it is preferable to add sufficient ammonia or ammonium hydroxide to provide the pH of the BRMA solution.

Weak acids suitable for use in the present invention comprise substantially any that dissolve in water to form an acidic solution adapted to convert fluoride anions to hydrogen fluoride. Examples of suitable weak acids include: water soluble fatty acids such as formic acid, acetic acid, and the like; substituted water soluble organic acids such as chloroacetic acid, hydroxyacetic acid, and the like; various water soluble polycarboxylic acids such as citric acid, and the like. The weak acids can be used in the form of individual acids or mixtures of acids. Particularly suitable weak acids are formic acid, acetic acid, and citric acid.

Weak acid salts suitable for use in the invention comprise substantially any water soluble salts of the weak acids of the type described above. Examples of suitable weak acid salts include the ammonium salts of such acids, such as ammonium formate, acetate, citrates, etc. The weak acid salts can be used as individual salts or as mixtures of salts. The salt of a given weak acid can be used with that weak acid or with one or more different weak acids. For example, a relatively small proportion of a weak acid salt that is adapted to provide a relatively high pH when it is dissolved in an aqueous solution along with a given weak acid can be used along with a salt of a different weak acid so that, due to the mixture of weak acid salts, the pH is initially kept at a higher value than that which is later maintained. Particularly suitable weak acid salts include the ammonium acetates, formates or citrates.

In making up, or compounding, the present acid solutions, the reactants can be mixed in substantially any order and/or formed within the aqueous solution. For example, in preparing a buffer-regulated mud acid containing ammonium fluoride, acetic acid and ammonium acetate, the solution can be formed by mixing an aqueous liquid with ammonium fluoride and/or ammonium bifluoride or acetic acid and/or acetic anhydride, in any order, and then adding enough ammonia or ammonium hydroxide to provide a concentration of ammonium ions exceeding the concentration of fluoride ions by an amount corresponding to a selected ratio of acetic acid to ammonium acetate. The components of the present acid solutions can be mixed at a surface location near the wall, within the conduits in a well, or at a location remote from the well from which the buffer-regulated acid solutions are transported to the well by means of containers and/or pipelines that are free of materials that are reactive with hydrogen fluoride or a weak acid.

The present high pH, high fluoride buffer regulated hydrofluoric acid (i.e., BRMA) solutions are capable of dissolving substantially any solids which are soluble in hydrofluoric acid. Their relatively low rate of corrosion adapts them for use as scale-removing acidizing fluids for use in hot boiler tubes, flow line components for hot saline solutions, etc. In such uses where the solids to be dissolved are substantially free of silicon the fluoride salts and/or weak acid salts utilized in the present solutions can comprise such salts of substantially any alkali metal.

We claim:

1. A well treating process for dissolving an acid soluble siliceous solid material within a well environment which contains corrodable metal and is hotter than about 300° F. comprising:
    compounding an aqueous acidizing solution to consist essentially of an aqueous solution which contains both a relatively high concentration of about 2 to 3 molar hydrogen fluoride equivalent of an ammonium fluoride and a concentration of weak acid and weak acid salt sufficient to provide a relatively high pH of at least about 5.5 but less than 7; and
    flowing the so-compounded acidizing solution into said well environment to contact and dissolve said acid soluble siliceous material in the absence of a corrosion inhibiting material.

2. The process of claim 1 in which substantially all of the salts contained in the acidizing solution are ammonium salts.

* * * * *